United States Patent [19]
Schetty et al.

[11] 3,884,269
[45] May 20, 1975

[54] FIBER-REINFORCED FLEXIBLE PLASTIC PIPE

[75] Inventors: Rudolf Schetty, Riehen; Borge Ingmar Carlstrom, Nitorp, Hoganas, both of Sweden

[73] Assignee: Basler Stuckfarbere AG, Switzerland

[22] Filed: Sept. 14, 1972

[21] Appl. No.: 291,691

Related U.S. Application Data

[63] Continuation of Ser. No. 70,693, Sept. 10, 1970, abandoned.

[30] Foreign Application Priority Data

Sept. 12, 1969 Switzerland.................... 13869/69
Nov. 28, 1969 Sweden........................... 16452/69

[52] U.S. Cl. ............................................. 138/137
[51] Int. Cl. ............................................. F16l 11/08
[58] Field of Search .......... 138/130, 132, 137, 140, 138/141, 153, 144; 161/55, 59, 144, 170, 156, 162, 231, 233, 66, 142, 93

[56] References Cited
UNITED STATES PATENTS

3,071,162  1/1963  Mick................................ 138/153 X
3,093,160  6/1963  Boggs................................ 138/140
3,406,724  10/1968  Carlstrom et al................... 138/137
3,407,101  10/1968  Lockshaw............................ 138/140 X

*Primary Examiner*—Jerry W. Myracle
*Attorney, Agent, or Firm*—McGlew and Tuttle

[57] ABSTRACT

Flexible plastic pipe is reinforced by providing alternating plastic layers incorporating fibers with layers of plastic-bound granulated mineral material. The layer affording the primary reinforcing strength may be located centrally between the inside and outside layers or interiorly of the center and has the fibers extending in the circumferential direction transverse to the axis of the pipe. In the other layers the fibers can be oriented at random and are generally shorter in length than the fibers in the centrally located layer. In forming the reinforced layers, fibers are supplied continuously and are cut to the desired length after the leading ends adhere to the plastic layer for properly orienting the fibers within the wall of the pipe.

15 Claims, 1 Drawing Figure

INVENTORS
RUDOLF SCHETTY
BÖRGE INGMAR CARLSTRÖM by

ATTORNEYS

FIBER-REINFORCED FLEXIBLE PLASTIC PIPE

This is a continuation, of application Ser. No. 70,693 now abandoned filed Sept. 10, 1970.

SUMMARY OF THE INVENTION

The present invention is directed to a fiber-reinforced, flexible plastic pipe and to its method of production, and, more particularly, it is directed to a multi-layer plastic pipe with at least certain of the layers containing reinforcing fibers and certain of the fibers oriented in the circumferential direction of the pipe to afford maximum strength.

Plastic pipes are known in which short glass fibers are used for reinforcement, for example, these short fibers have a length of about 20 to 30 mm. In addition to the fibers, these pipes contain plastic-bound, granulated mineral filler, such as sand, quartz sand, fired clay, slag and the like. The reinforcement fibers may be arranged in relatively sharply defined layers within the cross-section of the pipe or they may be distributed over the entire cross section of the pipe in uniform or varying concentration. However, such reinforced pipes are usually suitable only for relatively small internal pressures, in the range of 1.5 to 2.5 $kg/cm^2$, for example, such pipes are normally used in sewer systems, gravity water systems and the like which are installed in the ground. To produce such pipes with relatively large diameters, that is 60 to 200 cm, which would be suitable for greater internal pressure, with correspondingly stronger reinforcement in a circumferential direction, it has been proposed to form the pipe with an external reinforcement of glass fiber wound around an inner tube prefabricated by the winding or centrifugal method, the glass fibers are strengthened by a prior or subsequent application of plastic material to the pipe for forming a coherent outside layer joined to the inner tube. While the endless glass fiber or roving in the outer layer extends in the circumferential direction of the tube, and increases its resistance to internal pressure, however, it requires a relatively complicated method of production because the winding of an endless glass fiber presupposes at least a partial hardening of the inner tube, so that, particularly where the inner tube has been produced by the centrifugal method, there results an undesirable interruption in the production process.

Therefore, to avoid this disadvantage, the primary object of the present invention is to imbed individual lengths of glass fibers in the plastic material forming at least one of the layers of the pipe as the pipe is being produced in a centrifuging operation. To afford the requisite strength, for at least the most part, the individual lengths of glass fibers are oriented in the circumferential direction of the pipe.

As compared to the random imbedment of fiber lengths, this ordered arrangement of the lengths increases the strength of the pipe, however, the strength attainable by means of an endlessly wound glass fiber cannot be reached if the fiber lengths have the conventional length of 20 to 30 mm, since as a result of their short lengths the fibers do not adher sufficiently firmly to the plastic in which they are imbedded under radially acting internal pressure.

In accordance with the present invention the above disadvantage is overcome by providing the individual fibers in lengths exceeding 4 cm and orienting the fibers in the circumferential direction of the pipe in at least one fiber-reinforced layer. Due to the increased length of the fibers, their bond with the plastic material is improved over that of the conventional shorter fibers and because of their length the fibers can be arranged in the circumferential direction with considerably greater ease and safety. Further, it has been found that as compared to wrapping pipe with an endless fiber in an outer layer, the required resistance to internal pressure and to denting can be achieved with a smaller quantity of fiber if the relatively long fibers, oriented in the circumferential direction, are arranged in a layer located in the center of the reinforced pipe wall. Advantageously, the lengths of the fibers is between 5 and 20 cm, but in certain cases the lengths of the fibers can be as much as or more than the dimension of the internal circumference of the pipe.

To attain greater bending strength for the pipe in its longitudinal direction, it is advantageous to provide a layer of plastic-bound fibers oriented in the circumferential direction in layers located radially inwardly of and radially outwardly of the reinforced central layer. In certain cases, it is especially appropriate to provide both the relatively longer lengths as well as shorter lengths of the fibers all oriented in the circumferential direction. In accordance with the present invention, the method of producing reinforced plastic pipes involves the placement of the leading ends of the fibers, applied in the circumferential direction of the mold, in contact with the plastic layer on the mold prior to the step of cutting the fibers to the desired length so that the fibers are properly drawn onto the plastic layer in the desired orientation. Preferably, the fibers are applied to the plastic layer from a position located as closely as possible to the layer, so that the fibers travel only a relatively short path into contact with the plastic material while it still in a plastic condition. This arrangement for applying the fibers onto the plastic layers on the mold, avoids any problems caused by eddy currents developed as the mold rotates whereby these currents cannot displace the fiber lengths from the desired circumferential direction. Advantageously, while the leading end of the fibers adheres to the plastic material the trailing end is still guided by the feed device. Moreover, this method of feeding the fibers onto the plastic layer is particularly advantageous if the circumferential speed of the mold, that is, of the layer being formed, is somewhat greater than the rate of delivery of the fibers. As the leading ends of the fibers adhere to the plastic layer, they are drawn off by the adhesive effect and are correctly stretched and imbedded in the plastic material in the circumferential direction. In a preferred arrangement, where different lengths of fibers are applied to the plastic material, oriented in the circumferential direction, a cutting device is provided having several rotating cutting disks to each of which a fiber or roving is supplied and each disk is equipped with a different number of cutting knives the circumferential spacing of which is arranged to afford the proper cut length of the fibers.

The various features of novelty which characterize the invention are pointed out with particularity in the claims annexed to and forming a part of this specification. For a better understanding of the invention, its operating advantages and specific objects attained by its uses, reference should be had to the accompanying drawing and descriptive matter in which there is illustrated a preferred embodiment of the invention.

DETAILED DESCRIPTION OF THE INVENTION

Figure 1:
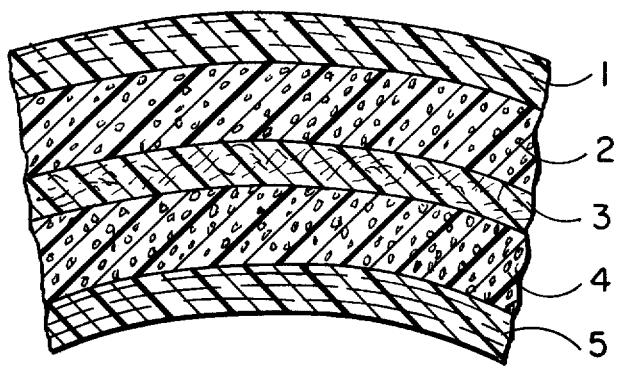
FIG. 1 is a partial transverse cross section of a reinforced plastic pipe formed in accordance with the present invention.

In FIG. 1, a so-called sandwich pipe construction is shown, produced by the centrifugal process and composed of a plurality of concentrically arranged layers. Extending inwardly from the outer surface of the pipe, it is formed of a layer 1 of glass fiber reinforced plastic, a layer 2 of plastic-bound, granulated mineral filler, a centrally arranged layer 3 of glass fiber reinforced plastic, a layer 4 of plastic-bound granulated mineral filler similar to layer 2 and an inner layer 5 of glass fiber reinforced plastic. In addition, outer and inner protective layers of plastic may be formed on the outer and inner layers 1 and 5 of the pipe structure in FIG. 1.

The pipe construction, shown in FIG. 1, is provided for an internal pressure in the range of 5 to 15 kg/cm$^2$, it may have a diameter of 40 to 200 cm, and its wall thickness may vary between 0.6 and 4 cm.

Suitable plastics for use in forming the various layers of the pipe are in particular, polyester resins, further, other resins may be used, for example, polyurethane resins. The granulated mineral filler can be a fine and/or coarse-grained sand or any other suitable granulated material including, for example, a porous mineral material having grain sizes between 0.5 and 10 mm. In the outer reinforced layer 1 short glass fibers having a length of 20 to 30 mm are used and they are oriented in the circumferential direction of the pipe. The first radially inner layer 2 serves as a spacing and stiffening layer. The centrally positioned reinforced layer 3 also contains short lengths of glass fibers which are oriented in a special direction. The next inner layer 4, which is similar to layer 2, also serves as a spacing and stiffening layer. In the interior reinforced layer 5, relatively long, that is over 40 mm, glass fiber fragments are used with their longitudinal axis oriented in the circumferential direction of the pipe. In this inner layer its fiber glass content is preferably between 50 and 70%. Further, between the two reinforced outer and inner layers 1 and 5 there may be provided more than two spacing and stiffening layers separated by a reinforced intermediate layer 3. Additionally, the glass fibers in the centrally located layer 3 may be oriented in the circumferential direction. It is also possible that the glass fibers in the outer layer 1 may be placed in a random arrangement, that is, not oriented in the circumferential direction. In another alternative arrangement, all three of the reinforced fiber layers 1, 3 and 5 and any additional reinforced fiber layers may have long lengths of the glass fibers oriented in the circumferential direction.

Figure 2:
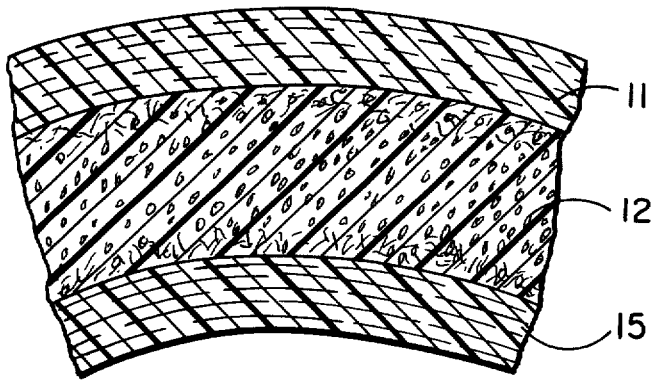
FIG. 2 is a partial transverse cross section of another embodiment of a reinforced plastic pipe, in accordance with the present invention.

In the pipe arrangement shown in FIG. 2, a multi-layer construction is provided with an outer layer 11 reinforced with short lengths of glass fibers extending in the circumferential direction, a spacer layer 12 and an inner layer 15 reinforced with long glass fiber lengths which are disposed in the circumferential direction of the pipe. The spacer layer 12 contains plastic-bound, granulated mineral filler and at least the two fiber reinforcing layers may contain additional relatively short fibers in a random arrangement. Of course, as can be appreciated, the short randomly arranged lengths of fibers may be omitted. The inner layer 15 contains the glass fiber material in the form of relatively long fibers extending in the circumferential direction and the outer layer 11 may also be reinforced with such long lengths of glass fiber. In addition inner and outer coating layers may be provided on the pipe structure shown in FIG. 2.

The pipes, as described above, can resist internal pressure up to 15 kg/cm$^2$ and this resistance is provided mainly by the layers reinforced by means of long glass fibers oriented in the circumferential direction of the pipe. Advantageously, the glass fiber lengths are selected in excess of 40 mm and preferably between 50 and 80 mm. Alternatively, glass fiber lengths of 150 to 250 mm or having a length equal to the circumference of the pipe may be used. Where such longer fibers are employed, care should be taken that their lengths do not represent uniform fractions of the circumference of the pipe so that the interruptions along the pipe between successive fibers do not lie along the same line.

The pipes described above are not only suitable for high internal pressures but they are also especially adaptable to underground installation with an overburden of several meters, since their radial elasticity permits a limited elastic deformation of the pipe cross section so that at least a part of the load of the overburden is transmitted to the surrounding soil.

The pipes, in accordance with the present invention, are produced continuously in a centrifuging operation. In this operation the pipe material is supplied to the pipe mold by means of a delivery head located adjacent to the inner face of the rotating pipe mold, that is, spaced from the mold axis, and the delivery head is moved back and forth in the axial direction of the pipe mold. Advantageously, the lengths of glass fiber are cut just before the lengths are applied to the mold and it is possible to employ a cutting device for severing more than one filament of glass fiber at a time with the result that a number of glass fibers, arranged in parallel, can be cut and delivered to the pipe mold at the same time. The orientation of the glass fibers in the circumferential direction can be achieved by aligning the fibers in the proper direction, such as by means of a nozzle, and affording additional guide means, for example an air stream, so that the individual lengths of the fibers are directionally arranged as they leave the delivery head and their arrangement is retained due to the guiding air stream and the adhesion of the leading end of the fibers to the plastic material on the pipe mold before the trailing end is cut.

In supplying the individual glass fibers to the pipe mold, it may be desirable to cut both long and short fiber lengths in the same operation. Accordingly, the cutting device can be arranged to sever one relatively long fiber length of between 150 and 250 mm and during the same time period also severing a plurality of relatively shorter fiber lengths of 25 mm or, alternatively, different lengths of 50 mm and 25 mm may be cut. The relative shorter fibers may be placed in an unoriented or random arrangement on the pipe mold, that is with the lengths extending in all directions, to afford good axial strength and, at the same time, the relatively longer fibers are placed on the pipe mold in the circumferential direction to assure good radial strength.

Plastic pipes formed in accordance with the present invention, can be designed especially for use in hydraulic lines installed below ground.

When flexible pipes are installed underground, a certain deformation results in the pipe. In very flexible pipes this deformation is very great and may be on the order of 10 to 15%. As a result rather high bending stresses develop in the pipe wall and in fiber-reinforced pipes the fibers are placed under a high stress before any internal pressure is developed. Due to this characteristic, only a small amount of the fiber reinforcement is available for absorbing internal pressure. To solve these problems a multi-layer pipe construction has been developed and a description of this new pipe follows. The multi-layer pipe consists of at least five supporting layers which, seen in the radial direction, have a general arrangement as shown in FIG. 1, however, for this description the layers are designated as $a$, $b$, $c$, $d$, and $e$ proceeding from the outer to the inner layers. On the outer and inner surfaces of the multi-layer construction, cover layers can be provided. The outer layer $a$, the centrally arranged or middle layer $c$, and the inner layer $e$ are reinforced with fibers. The layers $b$ and $d$ which space the fiber reinforced layers apart contain filler material such as sand having a grain size of 0.25 – 1 mm. The fibers within the middle layer $c$ are oriented primarily in the circumferential direction, and the fibers in the outer layer $a$ and inner layer $e$ have a random arrangement, that is, they are not oriented in any particular direction. The laminating resin in middle layer $c$ is of a normal type having a rupture elongation of about 3%, and the resin in layers $a$ and $e$, preferably have a higher rupture elongation of about 6 – 10%.

In this pipe construction the ratio of the wall thickness to the pipe diameter is in the range of 0.005 to 0.04, and preferably in the range of 0.01 – 0.02. Further, the modulus of elasticity is in the range of 75,000 to 200,000 kp/cm$^2$, and preferably is in the range of 120,000 to 160,000 kp/cm$^2$.

When the pipe, as described above, is installed below ground and filled with water under pressure, the pipe which has deformed under the load of the overburden of earth attempts to regain its original circular configuration and its deformation decreases. However, the stress caused by the initial deformation does not decrease in the same amount as the deformation decreases because the deformation pattern does not become elliptical any more. Because of the irregular deformation pattern, new stresses arise which are of the same order of magnitude as the initial stresses.

Experiments show that in a normally produced sandwich-pipe with fiber reinforcement in the radially outer wall portions of the pipe, the fiber reinforcement is not utilized to the maximum.

However, in the multi-layer pipe described above, the circumferentially oriented fibers are located in the middle portion of the pipe wall and sustain very little stress in the initial deformation of the pipe. If the modulus of elasticity is on the order of 150,000 kp/cm$^2$ and the ratio of the pipe wall to pipe diameter is in the order of 0.015, the initial deformation is limited to about 3 – 5% for a depth of overburden of 4 – 6 m and a modulus of elasticity of the soil of 20 – 30 kp/cm$^2$.

Under such conditions hardly any bending stresses occur in the middle layer $c$, and the circumferentially oriented fibers in that layer will provide the maximum absorption of the internal pressure.

The fibers in the two exterior layers, the outer layer $a$ and the inner layer $e$, mainly provide a good stability for the pipe and absorb bending stresses. Further, if the laminating resin used in these outer layers has a rupture elongation which is twice that of the resin in the center layer, they will also help to absorb the internal pressure.

The wall thickness of the middle layer depends on the fiber type, fiber content, pipe diameter and the operating pressure in the pipe. The wall thickness of the outer layers is considerably smaller than that of the middle layer.

In the following example a pipe, in accordance with the present invention, is described:

The layer construction of the pipe is as follows:

a. 1.0 mm layer containing 40% by weight of polyester A and 60% by weight of cut glass fibers 25 mm long.

b. 1.5 mm layer containing 75% by weight of sand and 25% by weight of polyester B.

c. 7.5 mm layer containing 50% by weight of polyester B and 50% by weight of cut glass fibers 150 mm long, with the fibers oriented in the circumferential direction of the pipe wall.

d. 1.0 mm layer containing 75% by weight of sand and 50% by weight of polyester B.

e. 1.5 mm layer containing 40% by weight of polyester A and 60% by weight of cut glass fibers 25 mm long.

Total pipe wall thickness including internal and external coating layers - 16 mm Pipe diameter - 1000 mm Modulus of elasticity - 140,000 kp/cm$^2$ Nominal pressure - 10 kp/cm$^2$ Polyester B is unsaturated styrene-containing polyester of normal type with a rupture elongation of 3% and Polyester A is a special type having a rupture elongation of 7%.

It will be appreciated that the pipe wall between its inner and outer coating layers may contain more than five layers. Instead of a single middle layer, two or more such layers may be provided. Instead of one inner layer two such layers may be used with one containing continuous fibers extending mainly in the axial direction of the pipe.

What is claimed is:

1. A fiber reinforced cylindrical flexible plastic pipe, comprising a wall formed of a plurality of layers bonded together, at least one of all layers comprising a plastic-bound granulated material layer, and at least one outer and one inner fiber-reinforced layer having fibers of approximately 40 mm in length, all of which are disposed in a curved circumferentially extending orientation throughout the layer thickness.

2. A fiber reinforced plastic pipe, according to claim 1 wherein there are two plastic-bound granulated material layers separated by an intermediate fiber reinforced layer, said intermediate fiber reinforced layer having short fibers of less than 30 mm in length randomly oriented throughout the intermediate layer thickness.

3. A fiber-reinforced flexible plastic pipe, comprising at least one fiber-reinforced plastic layer containing individual circumferentially separated lengths of fibers of over 40 mm in length uniformly dispersed throughout the layer thickness and all being curved in the circumferential direction of the pipe, said curved fibers overlapping the radial direction of the thickness of said wall.

4. Fiber-reinforced flexible plastic pipe, as set forth in claim 3, wherein the pipe comprises at least three plastic layers arranged in superimposed relationship, at least two of said layers reinforced by individual lengths of glass fibers and in at least one of said glass-fiber reinforced layers the lengths of glass fibers extend in the circumferential direction of the pipe, and said layer containing the fibers extending in the circumferential direction is located within the pipe walls so that it can absorb the maximum stresses acting within the pipe wall.

5. Fiber-reinforced flexible plastic pipe, as set forth in claim 3, wherein said layer having the lengths of fibers extending in the circumferential direction is located radially inwardly from the radial center of the wall of said pipe.

6. Fiber-reinforced flexible plastic pipe, as set forth in claim 3, at least one additional fiber-reinforced layer is positioned in the pipe wall radially outwardly from said one fiber-reinforced plastic layer having the fibers extending in the circumferential direction, and at least one spacer layer positioned between said fiber-reinforcing layers and said spacer layer containing plastic-bound granulated mineral filler material.

7. Fiber-reinforced flexible plastic pipe, as set forth in claim 6, wherein said spacer layer formed of plastic-bound granulated material contains cut lengths of glass fiber at least in the peripheral zones thereof adjacent said fiber-reinforced layers.

8. Fiber-reinforced flexible plastic pipe, as set forth in claim 3, wherein the pipe is formed of synthetic resin, filler material, and lengths of reinforcing fibers, and said pipe contains at least five supporting layers arranged in superimposed relationship with said one fiber reinforcing layer having its fibers extending in the circumferential direction forming the central layer of said at least five plastic layers.

9. Fiber-reinforced flexible plastic pipe, as set forth in claim 3, wherein said pipe has a diameter in the range of 40 to 200 cm and a wall thickness composed of said at least five plastic layers of 0.6 to 4.0 cm.

10. A fiber-reinforced flexible plastic pipe, comprising at least one fiber reinforced plastic layer containing individual circumferentially separated lengths of fibers of over 40 mm in length uniformly dispersed throughout the layer thickness and all being curved in the circumferential direction of the pipe, at least two additional fiber-reinforced plastic layers being provided spaced radially from said one plastic layer having the fibers of greater than 40 mm extending in the circumferential direction, said additional fiber-reinforced plastic layers containing shorter fibers of a length between 20 mm and 30 mm, and a spacer plastic layer containing granulated filler material disposed between each pair of said fiber-reinforced plastic layers.

11. Fiber-reinforced flexible plastic pipe, as set forth in claim 10, wherein said granulated filler material is selected from the group consisting of fine and coarse grain sand, and porous mineral material having grain sizes between 0.5 and 10 mm.

12. Fiber-reinforced flexible plastic pipe, as set forth in claim 10, wherein the shorter lengths of fibers in at least one of said additional fiber-reinforcing plastic layers has such shorter length fibers randomly oriented.

13. A fiber-reinforced flexible plastic pipe, comprising at least one fiber-reinforced plastic layer containing individual circumferentially separated lengths of fibers of over 40 mm in length uniformly dispersed throughout the layer thickness and all being curved in the circumferential direction of the pipe, said one fiber-reinforced plastic layer containing lengths of fibers extending in the circumferential direction has longer fibers of a length exceeding 40 mm and shorter fibers of a length of between 20 to 30 mm.

14. A fiber-reinforced flexible plastic pipe, comprising at least one fiber-reinforced plastic layer containing individual circumferentially separated lengths of fibers of over 40 mm in length uniformly dispersed throughout the layer thickness and all being curved in the circumferential direction of the pipe, said pipe comprising at least three plastic layers arranged in superimposed relationship, at least two of said layers reinforced by individual lengths of glass fibers and in at least one of said glass-fiber reinforced layers the lengths of glass fibers extend in the circumferential direction of the pipe, and said layer containing the fibers extending in the circumferential direction is located within the pipe walls so that it can absorb the maximum stresses acting within the pipe wall, said pipe being formed of synthetic resin, filler material, and lengths of reinforced fibers, and said pipe contains at least five supporting layers arranged in superimposed relationship with said one fiber reinforcing layer having its fibers extending in the circumferential direction forming the central layer of said at least five plastic layers, the synthetic resin in the outermost layer of said at least five plastic layers having a rupture elongation which is at least twice that of the rupture elongation of the synthetic resin in the centrally located said one fiber-reinforcing plastic layer.

15. Fiber-reinforced flexible plastic pipe, as set forth in claim 14, wherein said at least five plastic layers comprises an outer layer having a thickness of 1 mm and containing 40% by weight of polyester A, a special type of polyester having a rupture elongation of 7%, a second layer radially inwardly from and contiguous with said first layer and having a thickness of 1.5 mm and containing 75% by weight of sand and 25% by weight of polyester B, an unsaturated styrene-containing polyester of normal type with rupture elongation of 3%, a third layer located radially inwardly of and contiguous with said second layer and having a thickness of 7.5 mm and containing 50% by weight of polyester B and 50% by weight of glass fibers having a length of 150 mm with the fibers oriented in the circumferential direction, a fourth layer located radially inwardly of and contiguous with said third layer and having a thickness of 1.0 mm and containing 75% by weight of sand and 25% by weight of polyester B, and a fifth layer located radially inwardly of and contiguous with said fourth layer and having a thickness of 1.5 mm and containing 40% by weight of polyester A and 60% by weight of glass fibers having a length of 25 mm.

* * * * *